United States Patent [19]
Platusich

[11] Patent Number: 5,409,654
[45] Date of Patent: Apr. 25, 1995

[54] METHOD OF REACTION INJECTION MOLDING A VALVE

[75] Inventor: Bruce M. Platusich, Bristol, Ind.

[73] Assignee: Nibco Inc., Elkhart, Ind.

[21] Appl. No.: 103,919

[22] Filed: Aug. 5, 1993

[51] Int. Cl.⁶ .................... B29C 45/14; B29C 45/38
[52] U.S. Cl. ........................... 264/161; 29/890.127; 264/275; 264/278; 264/328.6; 264/328.12; 425/129.1
[58] Field of Search ............ 264/161, 275, 278, 328.6, 264/328.12; 425/127, 129.1, 114, 121, 125, 543; 29/890.127; 137/375; 251/305

[56] References Cited

U.S. PATENT DOCUMENTS

| | | |
|---|---|---|
| Re. 26,405 | 6/1968 | Killian .................. 251/306 |
| 2,130,254 | 9/1938 | Visman ................. 264/325 |
| 2,178,774 | 11/1939 | Bogoslowsky ....... 264/278 |
| 2,382,200 | 8/1945 | Brunner ............... 425/129.1 |
| 2,421,928 | 6/1947 | Davis ................... 264/162 |
| 2,571,259 | 10/1951 | Kusiak ................. 264/328.5 |
| 2,724,864 | 11/1955 | Krotz ................... 264/276 |
| 3,050,781 | 8/1962 | Killian ................. 264/275 |
| 3,072,139 | 1/1963 | Mosites ................ 137/375 |
| 3,122,353 | 2/1964 | Killian ................. 251/306 |
| 3,148,896 | 9/1964 | Chu ...................... 285/55 |
| 3,173,650 | 3/1965 | Cotterman et al. .. 251/306 |
| 3,186,682 | 6/1965 | Pierson et al. ....... 251/306 |
| 3,271,845 | 9/1966 | Breher ................. 264/278 |
| 3,318,567 | 5/1967 | Gifford ................ 251/306 |
| 3,438,388 | 4/1969 | Schenck, Jr. ........ 137/375 |
| 3,537,164 | 11/1970 | Williams .............. 251/306 |
| 3,537,683 | 11/1970 | Snell, Jr. ............. 251/306 |
| 3,565,394 | 2/1971 | Smith ................... 251/306 |
| 3,597,820 | 8/1971 | Schenck, Jr. ........ 137/375 |
| 3,660,552 | 5/1972 | Hinz et al. .......... 264/328.6 |
| 3,667,726 | 6/1972 | Church et al. ...... 251/306 |
| 3,670,071 | 6/1972 | Walchle et al. ..... 264/273 |
| 3,675,677 | 7/1972 | Scaramucci ......... 137/375 |
| 3,675,888 | 7/1972 | Scaramucci ......... 251/306 |
| 3,728,053 | 4/1973 | Stillhard et al. .... 425/208 |
| 3,738,383 | 6/1973 | David .................. 137/381 |
| 3,750,698 | 8/1973 | Walchle et al. ..... 251/305 |
| 3,771,764 | 11/1973 | Miyauchi ............ 251/306 |
| 3,790,130 | 2/1974 | Getty, Jr. ............ 251/306 |
| 3,840,042 | 10/1974 | Brundage ............ 137/327 |
| 3,904,173 | 9/1975 | Naylor ................. 251/306 |
| 3,913,892 | 10/1975 | Ersfeld et al. ....... 259/4 |
| 3,917,792 | 11/1975 | Conacher, Jr. ...... 264/328.6 |
| 3,940,108 | 2/1976 | Edwards .............. 251/306 |
| 3,958,595 | 5/1976 | Al et al. .............. 137/375 |

(List continued on next page.)

Primary Examiner—Jay H. Woo
Assistant Examiner—Robert B. Davis
Attorney, Agent, or Firm—Price, Heneveld, Cooper, DeWitt & Litton

[57] ABSTRACT

A mold and method of forming a butterfly valve and the novel valve formed. The concept includes providing a valve skeleton having a body portion, a hollow neck extending from the body portion to receive a valve stem and a cruciform-shaped actuator plate portion on the hollow neck, suspending the valve skeleton in a mold cavity in inverted orientation, and injecting reaction injection molding polymer by laminar flow into the bottom of the mold cavity with an amount of polymer sufficient to fill the space from the bottom up, encapsulating the skeleton, and overfill the space to force the leading edge of the polymer out the top of said space into said escape chamber to entrap residual gases into a severable offal member. The polymer encapsulates the cruciform-shaped actuator plate while filling the corner spaces thereof, except for fastener orifices which form adjacent the cruciform legs. A gate at the bottom of the mold assures laminar flow of polymer into the mold cavity. The valve skeleton may have a plurality of radially extending mounting leg portions fitting into lug-receiving cavities of the mold including at least one mounting lug-receiving cavity projecting radially outwardly and upwardly, the mold cavity including an upwardly oriented flow passage up from said at least one lug-receiving cavity to the polymer-receiving escape chamber, for flow of air from the at least one lug-receiving cavity through the flow passage to the escape chamber.

8 Claims, 5 Drawing Sheets

U.S. PATENT DOCUMENTS

| | | | |
|---|---|---|---|
| 3,981,671 | 9/1976 | Edwards | 425/453 |
| 3,984,510 | 10/1976 | Chandra et al. | 264/40.1 |
| 3,990,675 | 11/1976 | Bonafous | 251/148 |
| 4,025,050 | 5/1977 | Manki et al. | 251/306 |
| 4,129,636 | 12/1978 | Boden et al. | 264/51 |
| 4,146,206 | 3/1979 | Malloy et al. | 251/84 |
| 4,190,711 | 2/1980 | Zdrahala et al. | 521/112 |
| 4,201,365 | 5/1980 | Paptzun et al. | 251/328 |
| 4,259,980 | 4/1981 | Müller | 251/306 |
| 4,317,558 | 3/1982 | Sherlaw | 251/306 |
| 4,470,785 | 9/1984 | Koorevaar | 425/116 |
| 4,510,965 | 4/1985 | Peroux et al. | 137/375 |
| 4,516,597 | 5/1985 | Ueda | 251/306 |
| 4,580,593 | 4/1986 | Herberholz | 137/375 |
| 4,580,603 | 4/1986 | Schoen | 137/630.15 |
| 4,604,254 | 8/1986 | Yamamoto et al. | 264/254 |
| 4,646,407 | 3/1987 | Mayhew, Jr. | 29/890.127 |
| 4,740,347 | 4/1988 | Sloan, Jr. et al. | 264/262 |
| 4,774,750 | 10/1988 | Platusich | 264/275 |
| 4,777,977 | 10/1988 | Platusich | 137/375 |
| 4,826,133 | 5/1989 | Hiltebrand | 251/306 |
| 4,899,775 | 2/1990 | Calvin | 137/15 |
| 4,899,984 | 2/1990 | Strickler et al. | 251/306 |
| 4,939,830 | 7/1990 | Janian | 29/173 |
| 4,944,325 | 7/1990 | Baldwin et al. | 137/375 |
| 4,957,677 | 9/1990 | Katoh et al. | 264/135 |
| 4,998,708 | 3/1991 | Pavanel | 251/306 |
| 5,098,064 | 3/1992 | Daly et al. | 251/306 |

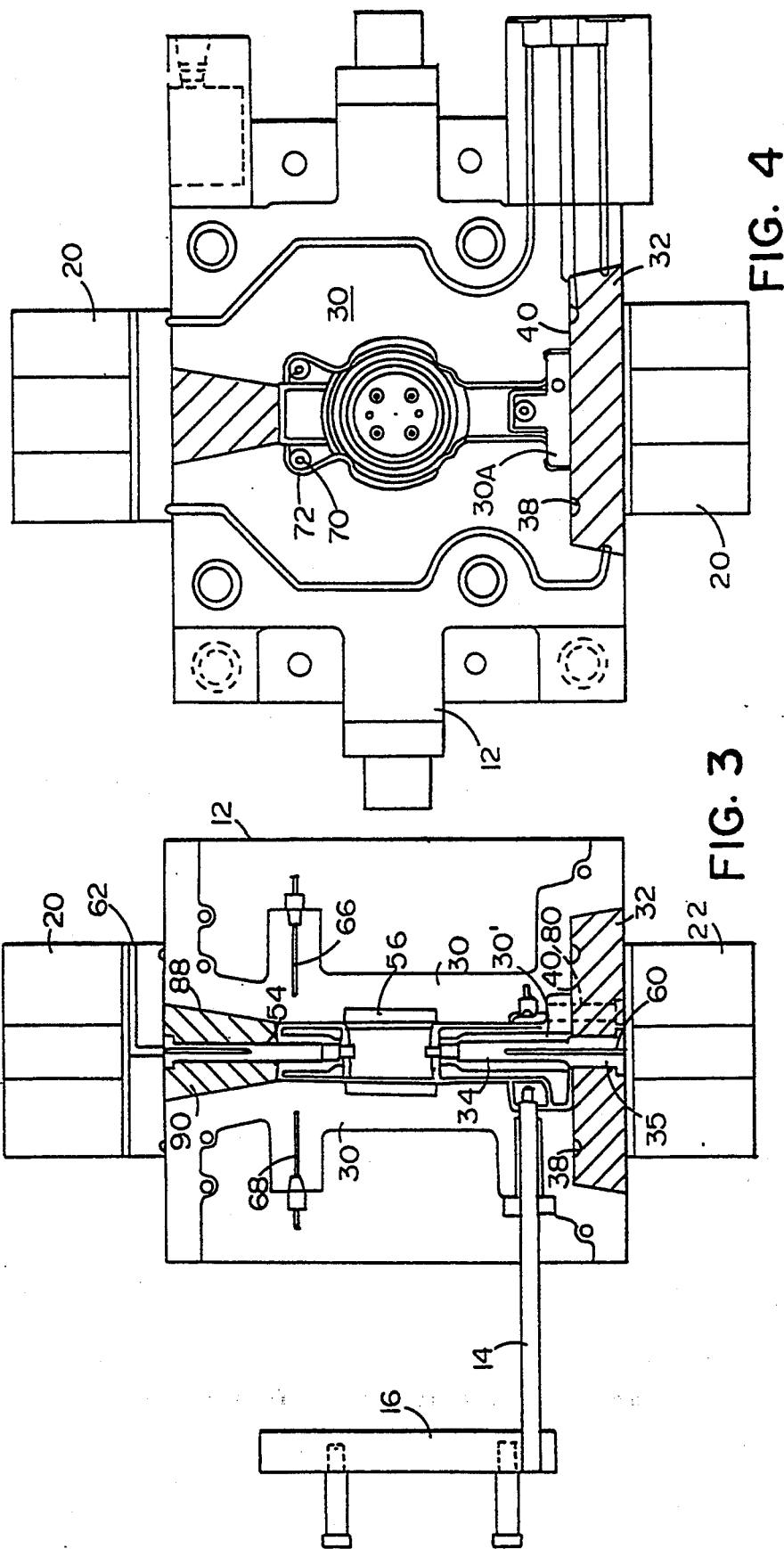

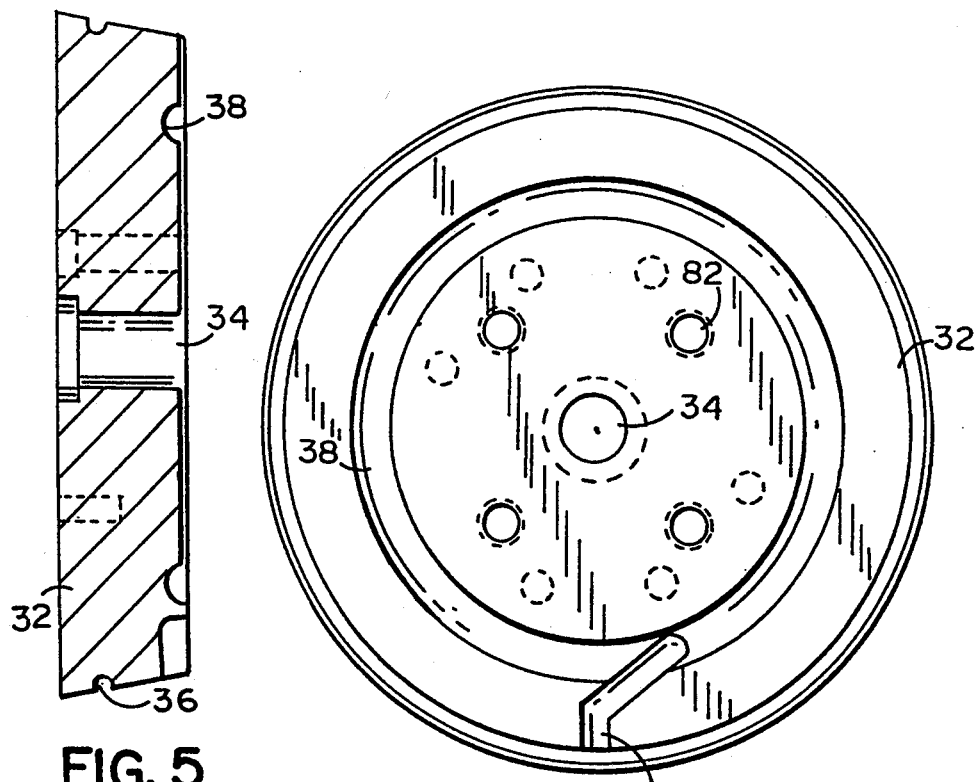
FIG. 5
FIG. 6
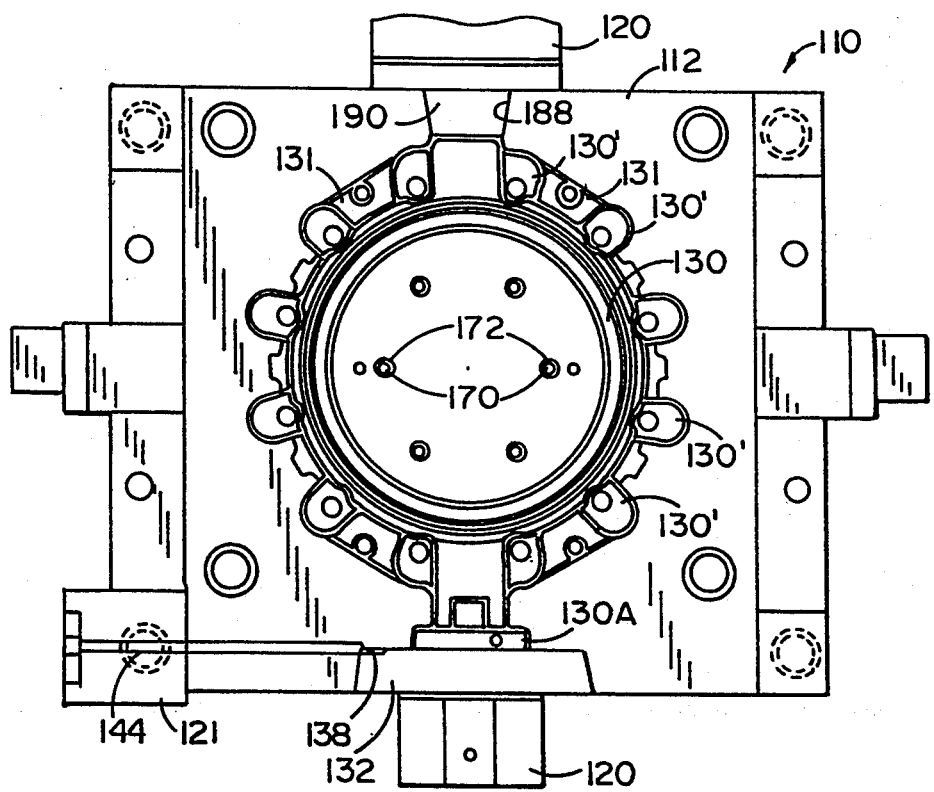
FIG. 7

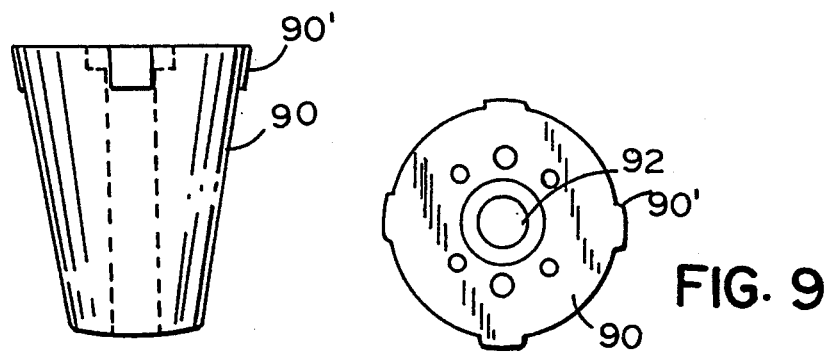
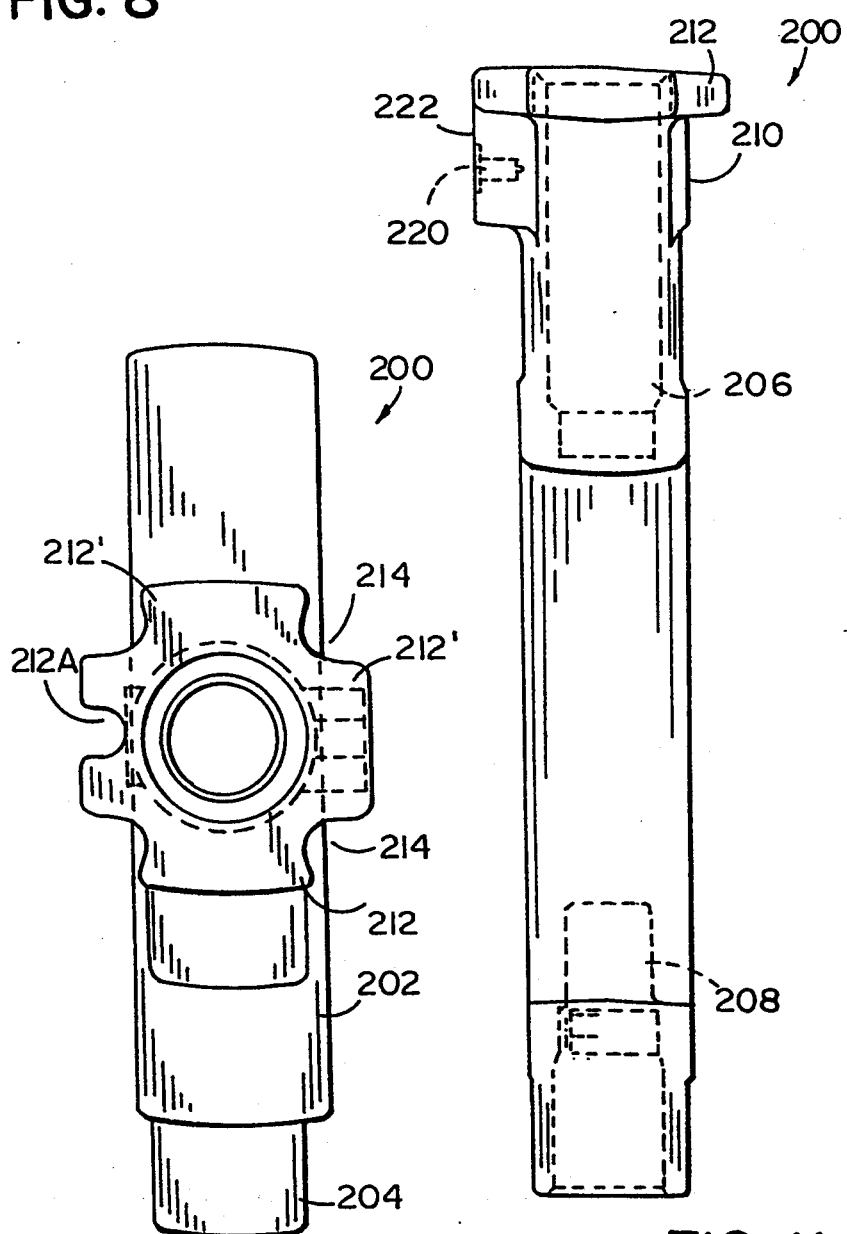

METHOD OF REACTION INJECTION MOLDING A VALVE

BACKGROUND OF THE INVENTION

Butterfly valves have for many years been manufactured by casting a rough valve body, machining the several required surfaces including the end faces, the valve seat where the disc engages and seals, the actuator flange face and fastener openings, and the stem bore. All of these must be highly accurate surfaces for proper smooth function and full closure of the valve. These machining operations are very costly and sometimes difficult to achieve, especially on large valves having a substantial weight.

Consequently, the inventor herein, in efforts to lower the cost of the valve, and to improve its manufacturing ease, conceived of an injection molding technique for valve components as set forth in U.S. Pat. Nos. 4,774,750 and 4,777,977. That injection molding technique involved pressures in the general range of about 8,000 to 10,000 pounds per square inch and up. The earliest attempts in this regard resulted in the grey iron valve body breaking up under the pressures involved. Yet it is desirable to employ grey iron castings for cost reasons, if possible. Later attempts involved complex techniques in efforts to balance the pressures across certain surfaces of the valve body so as to not destroy the valve body under the tremendous injection molding pressures. Although it was found possible to do this for certain valve components, this advantage was not enough to instigate commercial use of the technique. The cost of molds for the injection process of these prior patents was high, being in the range of about $70,000. Consequently, the older, standard manufacturing method involving several costly machining steps has largely prevailed.

The assignee herein has previously employed the technology set forth in U.S. Pat. No. 4,740,347 to commercially produce certain components of butterfly valves. This involves injection molding of rubber around valve stem bearings after mounting them on a previously machined replica of the valve and stem, and placing them in the unmachined (or rough machined) opening in the valve housings.

Still, whichever of these known commercial manufacturing processes was used, the cost of producing quality butterfly valves has been relatively high, with production requiring several complex operations.

SUMMARY OF THE INVENTION

An object of this invention is to provide a butterfly valve that requires no machining of its surfaces, and requires no high pressure molding. The novel valve has a rigid inner skeleton, as of metal, and a reaction injection molded, encapsulating, polymeric outer body forming all of the exterior surfaces, even the valve seat, the end face seals, the stem passages, and the actuator plate surface. The skeletal structure of the valve can be of inexpensive grey iron. The final valve product has accurate surfaces, including the valve seat in the water way, the actuator plate surface, the opposite end face seals, the stem holes or passages, and the valve disc edges which seal against the valve seat. Even the actuator plate orifices are molded rather than machined. The entire valve is encapsulated in the reaction injection molded polymer embedding the metal skeleton, forming the operative valve surfaces, and being impervious to corrosion-causing materials.

This valve is formed by a modified reaction injection molding process wherein the metal valve body skeleton is suspended in a mold, and then reaction injection polymer which has been degassed, and without a blowing agent, is injected into the mold from the bottom thereof under conditions which cause filling of the mold from the bottom with air being entrained in only the initial portion of the entering polymer, and ultimately forcing of this initial portion upwardly to flow into a collecting reservoir at an upper escape chamber above the valve-encapsulating cavity. In forming lug-type valves, flange-forming cavities are provided between the lug cavities to cause air in the lug cavities to be pushed out by the polymer which then forms flange protrusions projecting from the finished molded valve body between the lugs. These flanges extend upwardly from the radially extending mounting lugs of the valve body. The escape cavity space above the mold is generally annular, and preferably an annular frustoconically configurated flue passage, to form a projection which can be later cut off as offal.

The molds for this novel development can be made relatively inexpensively, of materials such as wood, epoxy polymers, plaster, metal, etc. The cost thereof is less than about one-fourth that of molds for the processes in the above noted prior art patents. The RIM polymer is purposely injected slowly into the bottom of the mold, flowing through a film gate and then upwardly in laminar flow, the initial polymer material carrying the residual gases/air with it through the mold into the configurated, upper, frustoconical exit chamber. The solidified hollow frustoconical member can later be trimmed off as offal. If the valve is a lug valve, the polymer flows between lug cavities to the exit chamber, resulting in flanges between the lugs on the finished valve. The flange-type protrusions can be trimmed off or simply form a part of the completed valve.

The valve skeleton is of cruciform configuration at the actuator plate area, leaving four corner recesses to receive molding material to complete the actuator plate, including the fastener-receiving orifices formed into the polymer. The mold preferably has a parting line for the waterway, axially off center from the plane of the disc spindle or shaft, causing the disc to seat other than at this parting line. The valve disc inner skeleton is also preferably suspended in a separate mold and encapsulated with reaction injection molded polymer, so that all exposed surfaces of the valve are of polymer.

BRIEF DESCRIPTION OF THE DRAWINGS

FIG. 3 is a sectional view of the mold assembly;

FIG. 4 is a side elevational view of one part of the mold assembly taken on plane IV—IV of FIG. 1, and for a wafer valve;

FIG. 5 is an enlarged sectional view of the ring gate block of the assembly in FIGS. 1–4;

FIG. 6 is an end elevational view of the ring gate block in FIG. 5;

FIG. 7 is an elevational view of another portion of a mold for a twelve-lug valve in accordance with this invention;

FIG. 8 is a side elevational view of a core for the exit chamber of the mold assembly;

FIG. 9 is an end elevational view of the core in FIG. 8;

FIG. 10 is a top plan view of a valve body skeleton of this invention;

FIG. 11 is an end elevational view of the valve skeleton in FIG. 10;

DESCRIPTION OF THE PREFERRED EMBODIMENT

Figure 2:
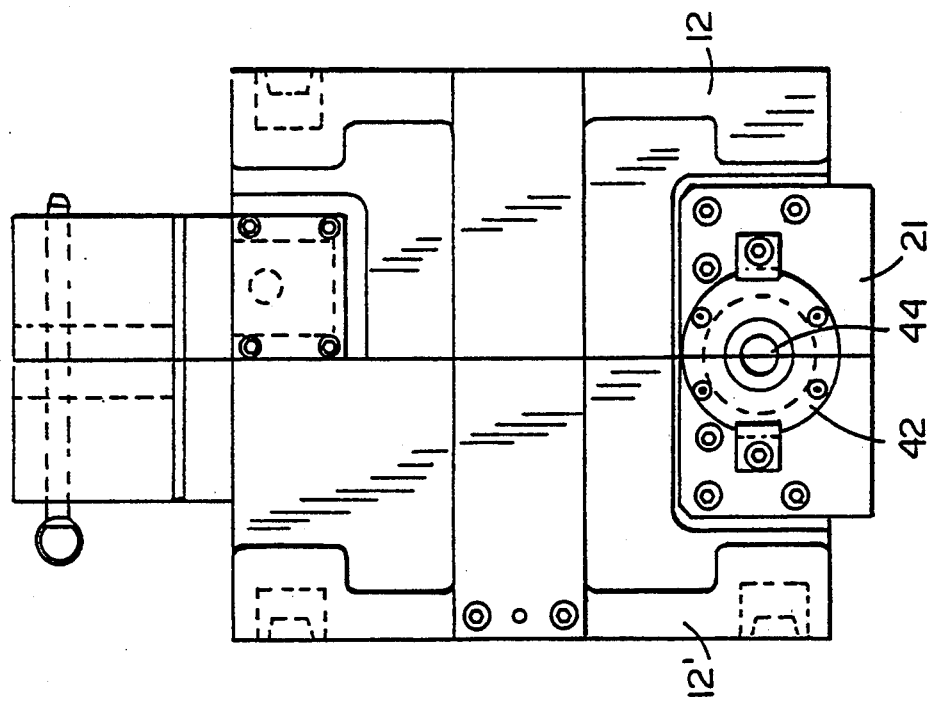
FIG. 2 is an end elevational view of the mold assembly.
Figure 1:
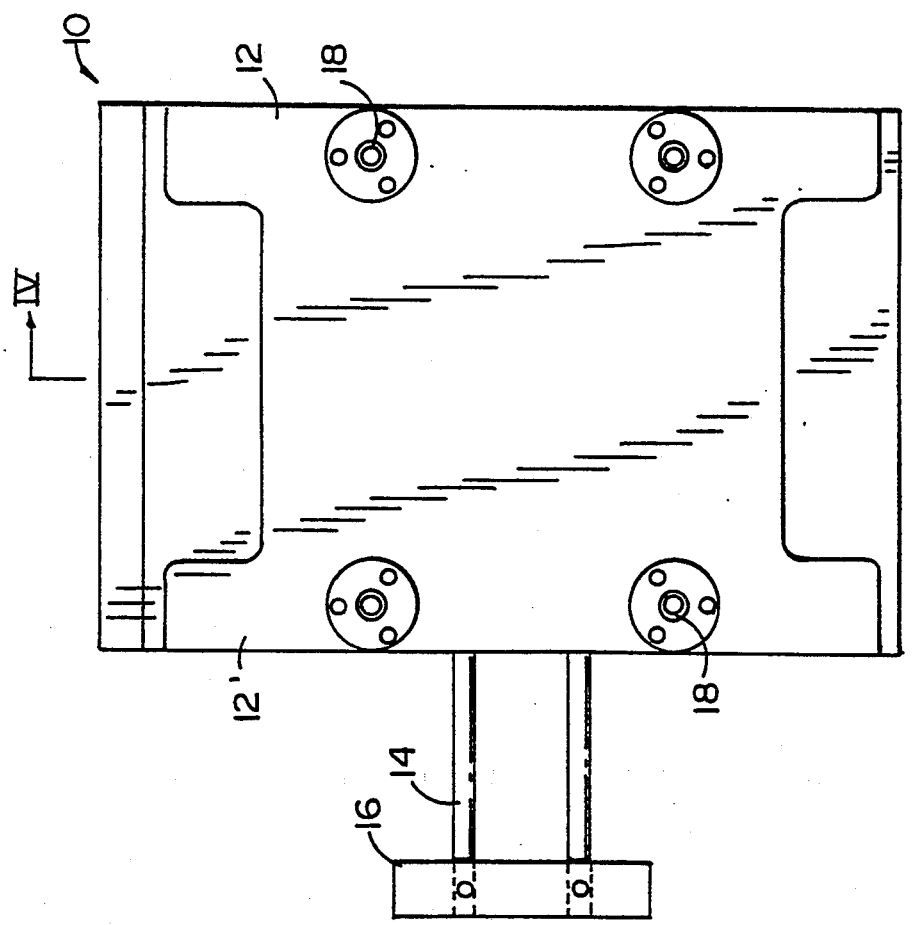
FIG. 1 is a side elevational view of a mold assembly according to this invention.

There will first be described a mold assembly, then a valve and the method of making it, with reference specifically to the drawings, Two specific valve embodiments are illustrated. The method set forth herein was developed primarily to make butterfly valves. It can be employed to make lug-type valves as well as wafer-type valves, the latter not having mounting lugs. A key factor in the present development is a special type of reaction injection molding, commonly known as RIM, in a fashion different from the normal molding procedures wherein RIM is typically used as for manufacturing such items as automobile components. Typically, RIM mold cavities are to be filled as rapidly as possible, with injection time being in a matter of several seconds, involving forced flow of the polymer into the mold cavities as rapidly as possible. Blowing agents are a typical component of this injected material.

The manufacture of valves in accordance with the technology set forth herein is particularly suitable for large valves as for use in industrial operations where exposure to chemicals and/or other high corrosive or stress conditions are common. The mold assembly 10 employed includes first and second mold halves 12 movable together to define a mold cavity therein, one mold half 12' including a plurality of ejector pins 14 mounted on an ejector plate 16 and extending through mold half 12' into the mold cavity 30 for ejection of the finished valve therefrom. Mold assembly 10 is shown to include a plurality (here four) of heating and/or cooling fluid ports 18. The depicted mold in FIG. 3 has a pair of quick disconnect blocks 20 and 22. At the bottom of cavity 30 is a circular ring gate block 32 having a central opening 34 (FIGS. 3, 5 and 6), an annular, peripheral O-ring groove 36 for placement of an O-ring seal, and defining an annular gate passage 38 on its upper surface serving as a feed gate from a radially oriented inlet passage 40. The cross sectional shape of feed gate 38 is basically semicircular, the circular area of the upper surface of ring gate block 32 radially inside of feed gate 38 being in a plane vertically offset slightly from the plane of the area radially outside feed gate 38, to create a thin film gate, annular in shape, from feed gate 38 to the central core opening 30' part of cavity 30. The height of film gate 40 should be no greater than about thirty thousandths of an inch, to cause slow injection of the RIM material and assure laminar flow into the mold cavity. In fact, in contrast to most RIM processes, an object of the present development is to inject the RIM material slowly into the mold cavity. It has been found necessary to the production of good valves to assure that all residual air is forced out of the mold cavity during the molding process. Optionally, the cavity can be evacuated. Further, the polymer is purposely degassed prior to injection, as by drawing a vacuum on its container. Moreover, blind cavities formed by radially, outwardly, upwardly extending lug cavity portions are specially treated to assure that no air is entrapped in these areas, as will be explained more fully hereinafter.

The mold cavity 30 is vertically arranged, with the injection gate at the bottom as shown in FIG. 3, for example. Mounted on the bottom of the mold assembly is the shot head mounting block 21 which has a laterally oriented injection port 44 in the shot head coupling 42. Port 44 is in communication with annular feed gate 38 through entry passage 40.

Extending upwardly from the bottom of the mold assembly into the mold cavity 30 is a core pin 35. Extending downwardly into the mold cavity from the upper end of the mold assembly is a second core pin 54 coaxial with core pin 35. These form cylindrical openings in the final product for the lower and upper valve stems mounted to the disc for the valve. Preferably, thermocouples 60 and 62 extend into these stem cores respectively, along with a combination electrical heater, to keep the stem cores at a predetermined desired temperature during the molding process. Further, laterally oriented thermocouples 66 and 68 (FIG. 3) extend into the opposite sides of the mold cavity 30. Between the two stem cores 34 and 54 is a transverse, central, cylindrical core 56 for forming the fluid passage in the final valve.

A plurality of laterally projecting, slidable pins 70 (FIG. 4) having annular faces 72 therearound, e.g., see the three pins in FIG. 4, are shiftable into the mold cavity to engage spot faced orifices in a valve skeleton, to hold the skeleton suspended and located within the mold cavity. The valve skeleton is preferably of cast grey iron. The number of pins 70 can vary with the particular size and configuration of the valve, with three being shown in FIG. 4 and six being shown in FIG. 7. FIG. 7 shows a mold for a 12-lug valve. Four vertically insertable core pins 80 (FIG. 3) are inserted upwardly in cavity 30, through vertical openings 82 in ring gate block 32, to serve as core pins for the polymer to be molded around the valve actuator plate cruciform to be further described hereinafter.

At the upper end of the mold is an annular, inverted-frustoconical escape chamber 88 (FIG. 3) around a like frustoconically shaped core 90 (FIGS. 3, 8 and 9). Core 90 has a plurality of radially outwardly projecting locating shoulders 90' at intervals, here 90° intervals, around its periphery, to engage the inner wall of a like configurated cavity formed between the mold halves 12 and 12'. These shoulders are preferably about sixty thousandths of an inch thick. These components therefore define the thin escape chamber 88. The importance of escape chamber 88 will be discussed hereinafter relative to its function. A central opening 92 in core 90 allows insertion of stem core 54.

The mold assembly 110 set forth in FIG. 7 includes mold halves 112, quick disconnect blocks 120 at the top and bottom, and shot head mounting block 121 having injection port 144 leading to annular ring gate 138 in ring gate block 132, generally comparable to the components in the above-described embodiment. In this instance, however, the mold is to enable encapsulation formation of a twelve-lug valve. Therefore, the mold has twelve peripherally spaced lug cavities 130' in mold cavity 130, each of these lug cavities extending radially outwardly from the main cavity. Thus, at the upper end of the mold, accommodating the lower end of the inverted valve, the lug cavities extend radially upwardly and outwardly. During molding from the bottom of the cavity, some air could be entrapped in the uppermost portions of the upper lug cavities. This has been found to cause a defective final valve. Between these uppermost lug cavities is a passageway formed on each side, i.e., passageways 131, interconnecting the uppermost lug cavities and communicating through these uppermost cavities to escape chamber 188. This escape chamber is basically annular, specifically preferably inverted-frustoconical, being defined between the two mold members 112 and the frustoconical core 190 by spaced outwardly projecting shoulders like those at 90' in FIG. 8.

Whether the wafer valve is to be formed in the mold of FIGS. 3 and 4, or a lug valve with a plurality of lugs is to be formed as in the mold of FIG. 7, the molding occurs with encapsulation of a valve skeleton which is inverted, i.e., has its encapsulation actuator plate down. Thus, the actuator plate will be in transverse cavity portion 30a in FIG. 4, or transverse cavity portion 130a in FIG. 7, immediately above the ring gate block.

Figure 13:
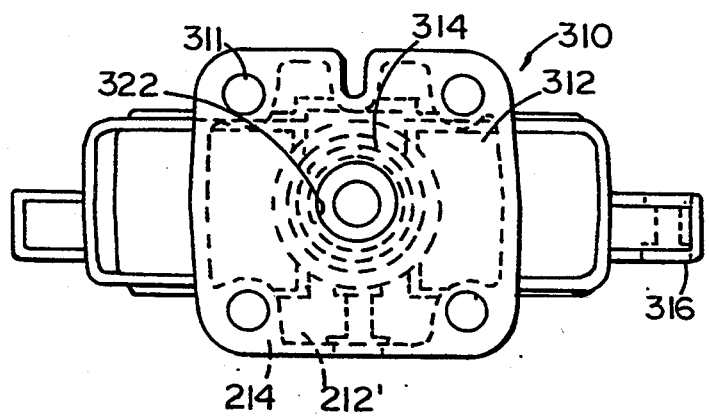
FIG. 13 is a top plan view of the valve in FIG. 12.

When the valve is to be formed according to the novel process, a valve skeleton is suspended within the mold cavity and located by a plurality of locator pins. In FIGS. 10 and 11 is disclosed a valve skeleton of the type to be encapsulated. This valve skeleton 200 is preferably of metal, and most preferably of cast grey iron. It includes a body 202 of generally annular configuration and, if of a lug type, has radially outwardly extending lugs 204 around its periphery. The number of lugs will depend upon the size of the valve and its use. The valve body is generally flat, defining a through passageway from one side to the other, and having cored upper and lower vertically extending passages 206 and 208 for the upper and lower valve shafts to be later assembled. Extending from the upper end of the body is a hollow neck 210 having an actuator mounting plate skeleton 212 on the upper end thereof. This skeletal flange or plate is of cruciform configuration, having four legs extending at 90° intervals as shown at 212' in FIG. 10. Two of the legs may optionally include slots 212a. The four corner spaces 214 between legs 212' are substantially filled with molding compound, except that four core pins 82, as mentioned earlier relative to FIG. 6, extend upwardly into these spaces 214 to form fastener receiving orifices 311 (FIG. 13). These orifices receive fasteners, e.g., bolts, for attachment of the actuator (not shown) which may typically be pneumatically, electrically or manually operated. The encapsulated actuator plate must be capable of withstanding bolting, and torsional loads. The molded bolt holes 311 are in spaces 214 and immediately adjacent the metal skeleton legs 212' (FIGS. 10 and 13) so as to provide torsional strength from the metal casting.

Preferably, on at least one side face of the valve body skeleton are at least three spot faced orifices 220 having an annular, axially offset face 222 around each orifice for engagement by locator pins 70 and annular shoulders 72 (FIG. 4), or locator pins 170 and annular shoulders 172 (FIG. 7) for suspension of and location of the valve skeleton within the mold cavity. This spot faced arrangement was used to form the product of U.S. Pat. No. 4,774,750 noted previously.

The encapsulation polymer may be of several possible materials including polyisocyanurate, polyurethane, polyurea, polycyclopentadiene and nylon. Most available RIM materials are of at least two part materials which chemically react together when mixed and injected. The "cream time," i.e., time between ingredient mixing and hardening, is desirably of at least 10–15 seconds, and preferably even 20–30 seconds. This contrasts with conventional RIM cream times of a few seconds and as short as possible. Conceivably the RIM material could be of a single part material such as that just being introduced by Dow Chemical Company, and which is understood to molecularly unzip when heated, and repolymerize when cured.

When RIM forming the novel valve, the mold and core are preferably preheated, e.g., to about 200° F., with the core pin temperature held to about 5° F. plus or minus.

When injecting the polymer, the shot pin 80 (FIG. 3) is stopped about ten thousandths of an inch short of the mold cavity to cause the RIM material to form a film over the top of the shot pin, to help prevent gas in the polymer. As noted earlier, it is important to avoid gas/air in the encapsulation material by degassing the polymer prior to molding, not including a blowing agent, and specially constructing the mold to sweep gas from the cavity.

Figure 12:
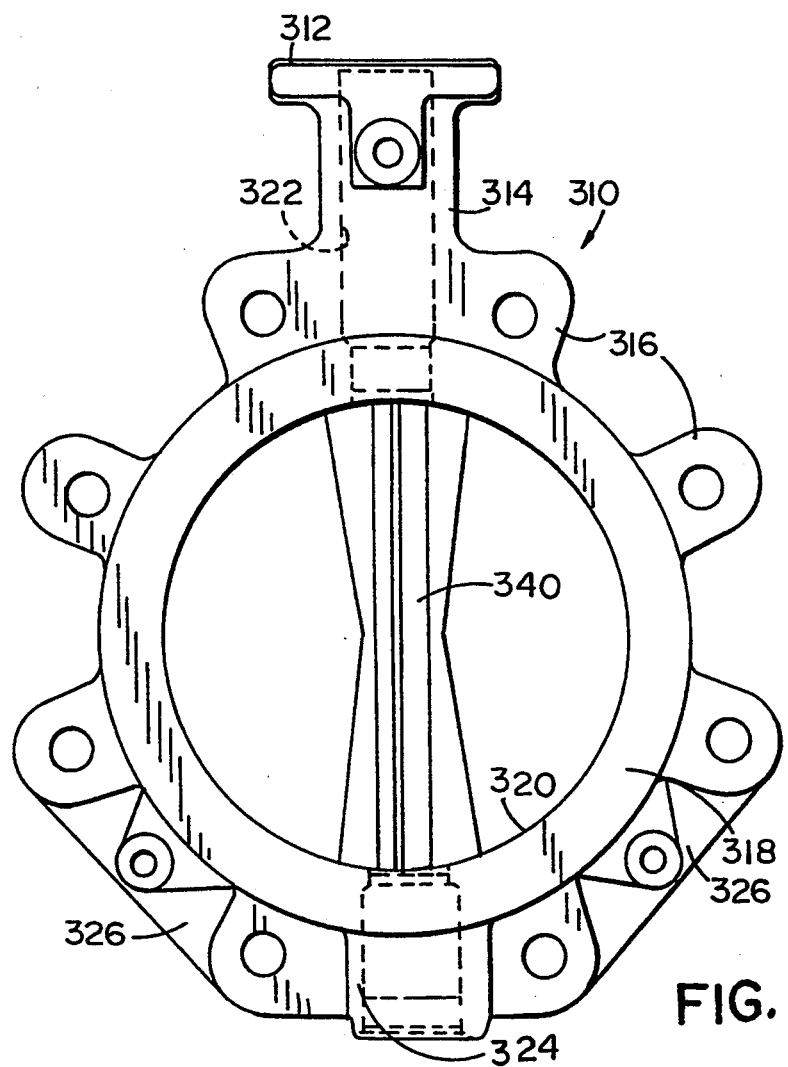
FIG. 12 is a side elevational view of an encapsulated finished eight-lug valve in accordance with this invention.

Once the skeleton is positioned in inverted arrangement in the mold cavity, and the mold halves are closed thereon, the RIM material is injected under nominal pressures of only about 20 psi through the injection port 44 (FIG. 2) or 144 (FIG. 7) to the annular feed gate 38, flows through the thin annular film gate 40 into the mold cavity to surround the mounting flange skeleton 212' (FIG. 10) and fill the spaces 214 except for the cores that form the openings 311 for fasteners. The molding compound is then slowly forced upwardly into the mold cavity 30 in laminar flow, to fill the cavity and encompass the entire valve body skeleton while heat is simultaneously being applied to the lower stem core 34, the upper stem core 54, the frustoconical core 90 and the mold cavity lateral portions by the thermocouple-controlled heaters. The leading portion of the molding material forced slowly upwardly in the mold cavity tends to entrap gaseous materials in the mold cavity. This gaseous residue is believed to permeate a small portion of the leading edge of the polymer compound. As the mold cavity becomes almost filled, if lug cavities such as those at 130' in FIG. 7 are present, containing the skeletal lugs, the uppermost lug cavities, i.e., toward the bottom of the valve, will project upwardly outwardly so as to possibly entrap air therein. The air is forced out of these lug cavities through the flange passages 131 (FIG. 7) between the upper lug cavities, and eventually out into escape chamber 188 at the top of the mold. Whether or not the lug cavities are present, the leading edge of the polymer is forced up into this annular escape chamber 188 between core 90 (or core 190) and the remainder of the mold parts 12 (or 112) so as to not be part of the encapsulated valve being formed. When the molding compound has been cooled, the mold halves are separated and ejector pins 14 are shifted laterally by ejector plate 16 to discharge the encapsulated valve from the mold cavity. This valve 310 (FIGS. 12 and 13) has its skeletal body encapsulated in the molding compound, to form the actuator mounting flange 312, the neck 314, the lugs 316, and the valve body proper 318, defining the flow passage 320. It forms the shaft bearings 322 and 324, and forms the flanges or wings 326 between the bottom lugs. These flanges were created by polymer flowing through passages 131 described previously relative to the inverted arrangement of the valve in the mold. The frustoconical residue of the polymer that contains entrapped air may be severed from the valve as offal so that the final valve, as shown in FIG. 12, does not contain this component. In similar fashion, the disc for the valve is suspended and encapsulated with polymer using this degassed, laminar flow RIM technique to form the final disc 340 which rotates on its shafts.

There are many advantages to the development discussed above. The mold components can be relatively inexpensive. The components are not exposed to tremendously high pressures like typical injection molding of the prior art, the process is dependable, the resulting product is free of encapsulated air, the product is encapsulated so as to be impervious to corrosive components and the like. Generally speaking, the product can be made less expensively and more quickly than with known prior art techniques, but yet yield a superior product.

These and several other objects, advantages and features will be apparent to those in the art upon studying this disclosure which sets forth the preferred embodiments of the invention. However, inasmuch as obvious variations can readily be made to suit particular circumstances or types of valves, it is intended that the invention not be limited to the specific embodiments set forth as exemplary, but only by the scope of the appended claims and the reasonably equivalent structures and methods to those defined therein.

The embodiments of the invention in which an exclusive property or privilege is claimed are defined as follows.

1. A method of forming a butterfly valve comprising the steps of:
   providing a valve skeleton having a body portion, a hollow neck extending from said body portion to receive a valve stem and an actuator plate portion on said hollow neck;
   providing a mold defining a mold cavity of a size to suspend said valve skeleton therein with space around said valve skeleton, said mold cavity having a bottom, said mold having an escape chamber above said mold cavity, and said space having a top adjacent said escape chamber;
   suspending said valve skeleton in said mold cavity in inverted orientation such that said hollow neck is down; and
   injecting reaction injection molding polymer into said bottom of said mold cavity to first form a polymer leading edge and with an amount of polymer sufficient to fill said space from the bottom up and overfill said space to force said leading edge of the polymer out the top of said space into said escape chamber.

2. The method in claim 1 wherein said valve skeleton actuator plate is cruciform-shaped with four legs and corner spaces between said legs, and said polymer injection step includes encapsulating said cruciform-shaped actuator plate while filling said corner spaces, except for fastener orifices.

3. The method in claim 1 wherein said mold has a gate at the bottom thereof of a size to cause laminar flow of polymer into said mold cavity, and said step of injection comprises slow injection through said gate of polymer.

4. The method in claim 1 wherein said mold has an annular gate at the bottom thereof, and a narrow, circular gate between said annular gate and said mold cavity to prevent turbulent flow of polymer into said mold cavity.

5. The method in claim 1 wherein said valve skeleton has a plurality of radially extending mounting lug portions, and said mold defines a plurality of lug-receiving cavities including at least one mounting lug-receiving cavity projecting radially outwardly and upwardly, said skeleton having a radially outwardly and upwardly oriented lug portion in said at least one cavity, said mold cavity including an upwardly oriented flow passage up from said at least one lug-receiving cavity to said polymer-receiving escape chamber, and said step of injecting polymer includes forcing polymer and residual air from said at least one lug-receiving cavity through said flow passage to said escape chamber.

6. The method in claim 1 wherein said polymer is degassed prior to injection into said mold cavity.

7. The method in claim 1 including the step of providing at least three spot-faced orifices on one side of said valve skeleton, each said spot-faced orifice having a flat annular face around said orifice, and aligning said valve skeleton in said mold cavity relative to said spot-faced orifices.

8. A method of forming a valve comprising:
   providing a valve skeleton having a plurality of spot-faced orifices in said skeleton, each orifice having an axis and an annular surface around said orifice normal to the axis thereof;
   providing a mold having a mold cavity larger than said valve skeleton and with mold cavity walls, said mold cavity having a bottom and an upper portion having an inlet opening in said bottom of said mold cavity, said mold having alignment pins to be inserted into said orifices of said valve skeleton, having shoulders to engage said annular surfaces for retaining said valve skeleton spaced from said mold cavity walls, and having lobe cavities adjacent said upper portion of said mold cavity and a configurated escape chamber in the upper portion of said mold cavity;
   inserting said valve skeleton in inverted position into said mold cavity and inserting said pins into said orifices and engaging said shoulders against said annular surfaces to locate and suspend said valve skeleton in said mold cavity spaced from said cavity walls;
   injecting reaction injection molding polymer through said bottom inlet opening into said bottom of said mold cavity to form a first injection polymer portion and then forcing said polymer upwardly to fill said mold cavity around said valve skeleton and encapsulate said valve skeleton while forcing gases up out of said cavity through said escape chamber;
   overfilling said mold cavity while causing said first polymer portion into said mold cavity to flow into said escape chamber to transfer entrained gases into said escape chamber with said first polymer portion and thereby form a configurated offal portion in said escape chamber;
   solidifying said polymer;
   removing the encapsulated valve from said mold; and
   severing said offal portion from said encapsulated valve.

* * * * *